United States Patent
Shinkai et al.

(10) Patent No.: US 7,181,752 B2
(45) Date of Patent: Feb. 20, 2007

(54) CLAMP AND ALIGNMENT MECHANISM, AND INFORMATION RECORDING AND REPRODUCING MECHANISM USING THE SAME

(75) Inventors: Yasuhiro Shinkai, Kawagoe (JP); Shigeru Kojima, Kawagoe (JP); Kenji Nakamura, Kawagoe (JP); Kenji Uchiyama, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 546 days.

(21) Appl. No.: 10/637,849

(22) Filed: Aug. 7, 2003

(65) Prior Publication Data
US 2004/0027978 A1    Feb. 12, 2004

(30) Foreign Application Priority Data
Aug. 8, 2002    (JP) .......................... P2002-231753

(51) Int. Cl.
*G11B 11/028*    (2006.01)
(52) U.S. Cl. ...................... 720/707; 720/709
(58) Field of Classification Search ................ 720/707, 720/706, 709
See application file for complete search history.

(56) References Cited
U.S. PATENT DOCUMENTS

| | | | |
|---|---|---|---|
| 4,562,570 A * | 12/1985 | Denton | 720/709 |
| 5,166,920 A * | 11/1992 | Kogure | 720/707 |
| 5,323,379 A * | 6/1994 | Kim | 720/707 |
| 5,555,233 A * | 9/1996 | Yano et al. | 720/709 |
| 5,774,445 A * | 6/1998 | Sawi et al. | 720/707 |
| 6,038,206 A * | 3/2000 | Mukawa | 720/707 |
| 6,208,613 B1 * | 3/2001 | Iizuka | 720/707 |
| 6,222,818 B1 * | 4/2001 | Kobayashi et al. | 720/707 |
| 6,249,506 B1 * | 6/2001 | Oowaki et al. | 720/706 |
| 6,363,048 B1 * | 3/2002 | Wu et al. | 720/707 |
| 6,826,771 B1 * | 11/2004 | Wada | 720/707 |
| 6,868,549 B2 * | 3/2005 | Watanabe et al. | 720/715 |
| 6,907,611 B2 * | 6/2005 | Konno et al. | 720/604 |
| 2002/0031077 A1 * | 3/2002 | Shiwa | 369/271 |
| 2002/0089918 A1 * | 7/2002 | Watanabe et al. | 369/270 |
| 2002/0136154 A1 * | 9/2002 | Nakade et al. | 369/271 |
| 2002/0176352 A1 * | 11/2002 | Konno et al. | 369/271 |
| 2004/0205803 A1 * | 10/2004 | Horng et al. | 720/707 |

* cited by examiner

*Primary Examiner*—Brian E. Miller
(74) *Attorney, Agent, or Firm*—Ladas & Parry LLP (57) ABSTRACT

A clamp/alignment mechanism has: a turntable on which a recording medium is mounted, the turntable being rotated by a rotation driving device; a holding device for holding the recording medium mounted on the turntable; an aligning device for aligning the recording medium mounted on the turntable; and a driving device for driving both the holding device and the alignment device. The driving device is configured to drive the aligning device in an aligning direction along which the recording medium is subjected to alignment thereof, in cases where the holding device is driven in a holding direction in which the recording medium is to be held.

14 Claims, 9 Drawing Sheets

CLAMP AND ALIGNMENT MECHANISM, AND INFORMATION RECORDING AND REPRODUCING MECHANISM USING THE SAME

BACKGROUND OF THE INVENTION

1. Field of the Invention

The present invention relates to a clamp/alignment mechanism to hold (support) and align information recording mediums, such as CD (Compact Disc) and DVD (Digital Versatile Disc), on a turntable, and an information-reproducing mechanism and an information-recording mechanism both of which are equipped with the clamp/alignment mechanism.

2. Description of the Related Art

There have been widely known information-recording/reproducing mechanisms which are able to read out and write bits of information onto and from information recording mediums including CDs (such as CD-ROM, and CD-R) and DVDs (such as DVD-ROM, DVD-R, and DVD-R/W). It is required in general for such an information-recording/reproducing mechanism that the positional relationship between a recording medium and a pickup for reading and writing bits of information be kept with precision. Whenever the positional relationship between a disk under rotation and the pickup is changed, reading and writing bits of information is no longer performed with precision, resulting in a degraded quality of music and videos (images) when reproduced. In addition, the disk is generally made of synthetic resin, which makes it easier to give dimensional irregularities to the diameters of central holes of disks when manufactured, the central holes being used to be loaded onto a turntable. If the inner diameter (i.e., the diameter of a central hole) of a disk is misaligned in the radial direction, the disk cannot be loaded (mounted) concentrically on the turntable, thus causing eccentricity.

Figure 1:
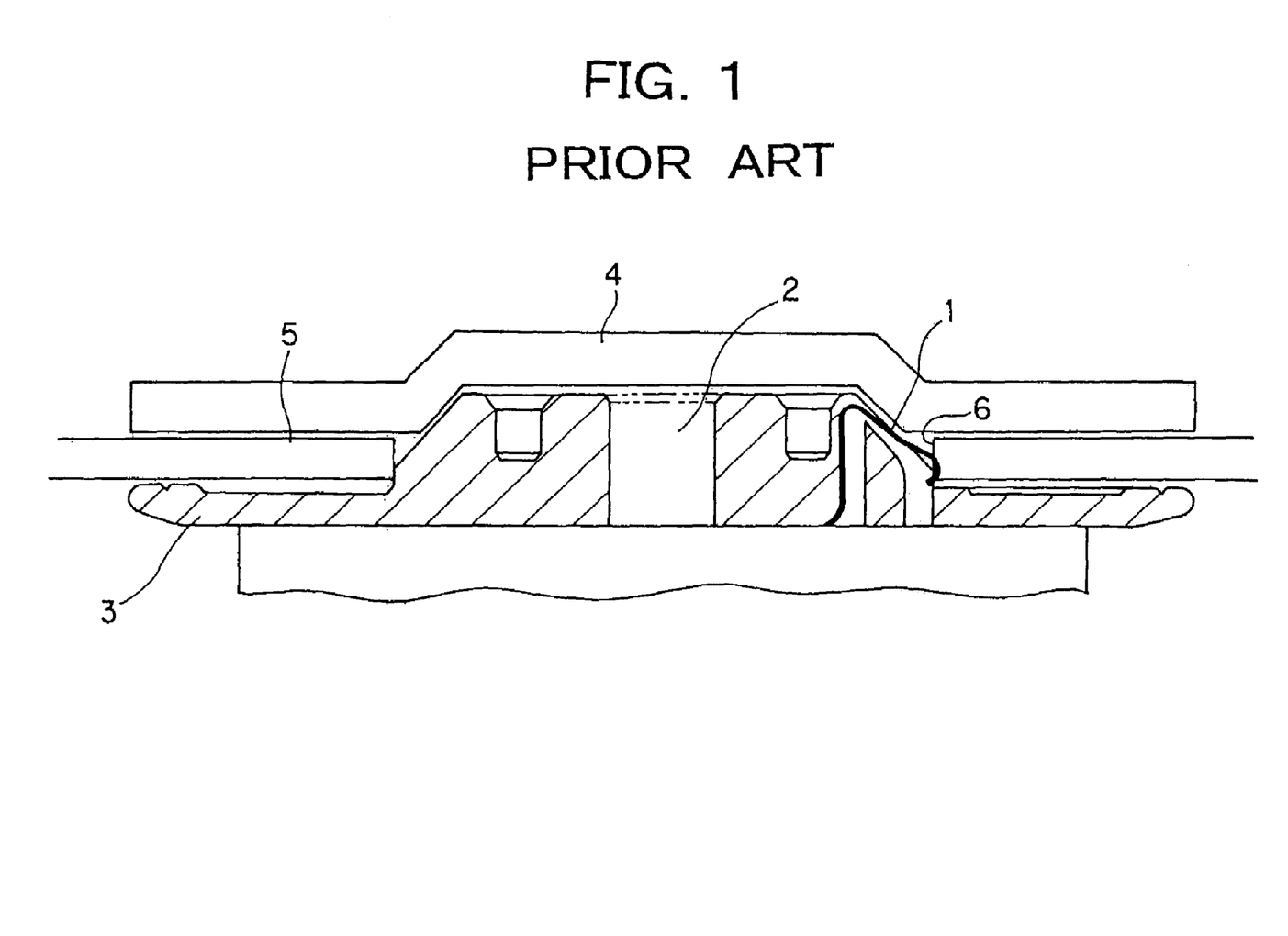
FIG. 1 shows part of a conventional information-recording/reproducing mechanism, wherein a disk is mounted and clamped on a turntable.

To overcome this problem, a conventional information recording/reproducing mechanism is provided with not only a disk clamping mechanism to hold a disk but also an alignment mechanism that is able to reduce the situation where the disk is placed eccentrically on the turntable. FIG. 1 exemplifies a conventional clamp mechanism, which is equipped with a conventional information recording/reproducing mechanism, with which a disk is clamped on a turntable. The clamp mechanism shown in FIG. 1 is provided with an aligning blade spring 1 serving as an alignment mechanism. The aligning blade spring 1, which can be deformed elastically, is loaded in a turntable so that the spring can be oscillated toward a rotary shaft 2 of a rotary motor. In addition, the aligning blade spring 1 is made to forcibly touch the inner circumferential edge 6 (i.e., the central hole) of a disk 5 mounted and held (supported) on a turntable 3 with the use of a clamp member 4 pressing the disk 5 downward. This construction allows the disk 5 to be pushed outwardly, whereby the disk 5 can be aligned in its radial direction.

However, the conventional information recording/reproducing mechanism has a problem caused when the disk 5 is mounted onto the turntable 3. That is, for mounting the disk 5 onto the turntable 3, the disk 5 is obliged to push the aligning blade spring 1 downward, so that the spring 1 can be moved away from the space needed for mounting the disk 5.

Therefore, since there is caused a situation in which the disk 5 is forcibly laid on the aligning blade spring 1, the disk 5 is apt to be affected by the aligning blade spring 1. It is therefore difficult to provide a stable alignment and clamping operation. Additionally, there is an effect from the aligning blade spring 1, because a load necessary to press down the disk 5 (that is, a clamping force) is necessarily required. Thus this gives rise to the need for an extra load for operation, which becomes another problem of the conventional clamp mechanism.

SUMMARY OF THE INVENTION

It is therefore an object of the present invention to provide a clamp/alignment mechanism capable of providing clamping and aligning operations in a stable manner, an information-reproducing mechanism provided with the clamp/alignment mechanism, and an information-recording mechanism provided with the clamp/alignment mechanism.

The above object of the present invention can be achieved by an clamp/alignment mechanism provided with: a turntable on which a recording medium is placed, the turntable being rotated by a rotation driving device; a holding device for holding the recording medium mounted on the turntable; an aligning device for aligning the recording medium mounted on the turntable; and a driving device for driving both the holding device and the alignment device, wherein the driving device drives the aligning device in an aligning direction along which the recording medium is subjected to alignment thereof, in cases where (when) the holding device is driven in a holding direction in which the recording medium is to be held.

According to the present invention, the recording medium can be clamped and aligned with stableness.

The above object of the present invention can be achieved by an clamp/alignment mechanism provided with: a turntable on which a recording medium is placed, the turntable being rotated by a rotation driving device; a holding device for holding the recording medium mounted on the turntable; an aligning device for aligning the recording medium mounted on the turntable; and a driving device for driving both the holding device and the alignment device, wherein the driving device drives the aligning device in an alignment-releasing direction along which the recording medium is subjected to release from an aligned state thereof, in cases where the holding device is driven in a hold-releasing direction in which the recording medium is to be released from a held state thereof.

According to the present invention, the recording medium can be clamped and aligned with stableness.

In one aspect of the clamp/alignment mechanism of the present invention, the holding device locates at a retreat position which disables the holding device for holding the recording medium and the aligning device locates at a retreat position which disables the aligning device for aligning the recording medium, in cases where the recording medium is mounted onto the turntable.

According this aspect, in mounting the recording medium onto the turntable, the influence (i.e., load) of the aligning device can be eliminated. Thus it is still sufficient to adopt a lowered clamping force.

In another aspect of the clamp/alignment mechanism of the present invention, the aligning device is made up of an elastic member having both ends, one end of which being fixedly engaged with the turntable, and the driving device pushes the other end of the elastic member in an alignment-releasing direction along which the recording medium is subjected to release from an aligned state.

In further aspect of the clamp/alignment mechanism of the present invention, the driving device has a movable member slidable in a direction perpendicular to a plane of the turntable on which the recording medium is mounted, the movable member being placed to push the other end of the elastic member in the alignment-releasing direction of the recording medium, in cases where the movable member is made to slide in a direction away from the plane of the turntable.

In further aspect of the clamp/alignment mechanism of the present invention, the holding device is made up of a plurality of chuck claws mounted rotatably on the turntable, wherein the movable member is placed to push the plurality of chuck claws in the hold-releasing direction of the recording medium, in cases where the movable member is made to slide in the direction away from the plane of the turntable.

In further aspect of the clamp/alignment mechanism of the present invention, the driving device includes a limiting device for limiting the holding device from being moved in the holding direction of the recording medium, in cases where the holding device is driven in a hold-releasing direction in which the recording medium is to be released from a held state.

In still further aspect of the clamp/alignment mechanism of the present invention, the holding device is made up of a plurality of chuck claws mounted rotatably on the turntable, the driving device has a movable member slidable in a direction perpendicular to a plane of the turntable on which the recording medium is mounted, and the limiting device pushes the plurality of chuck claws in the hold-releasing direction of the recording medium, in cases where the movable member is made to slide in a direction away from the plane of the turntable.

The above object of the present invention can be achieved by an information reproducing mechanism is provided the clamp/alignment mechanism.

The above object of the present invention can be achieved by an information recording mechanism is provided the clamp/alignment mechanism.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENT

Referring to the accompanying drawings, a preferred embodiment of the present invention will now be described. In the following, a disk-reproducing mechanism employed as an information-reproducing mechanism will be described. The disk-reproducing mechanism, which adopts a clamp/alignment mechanism according to the present invention, is configured to reproduce bits of information recorded on recording mediums, such as CDs and DVDs.

Figure 2:
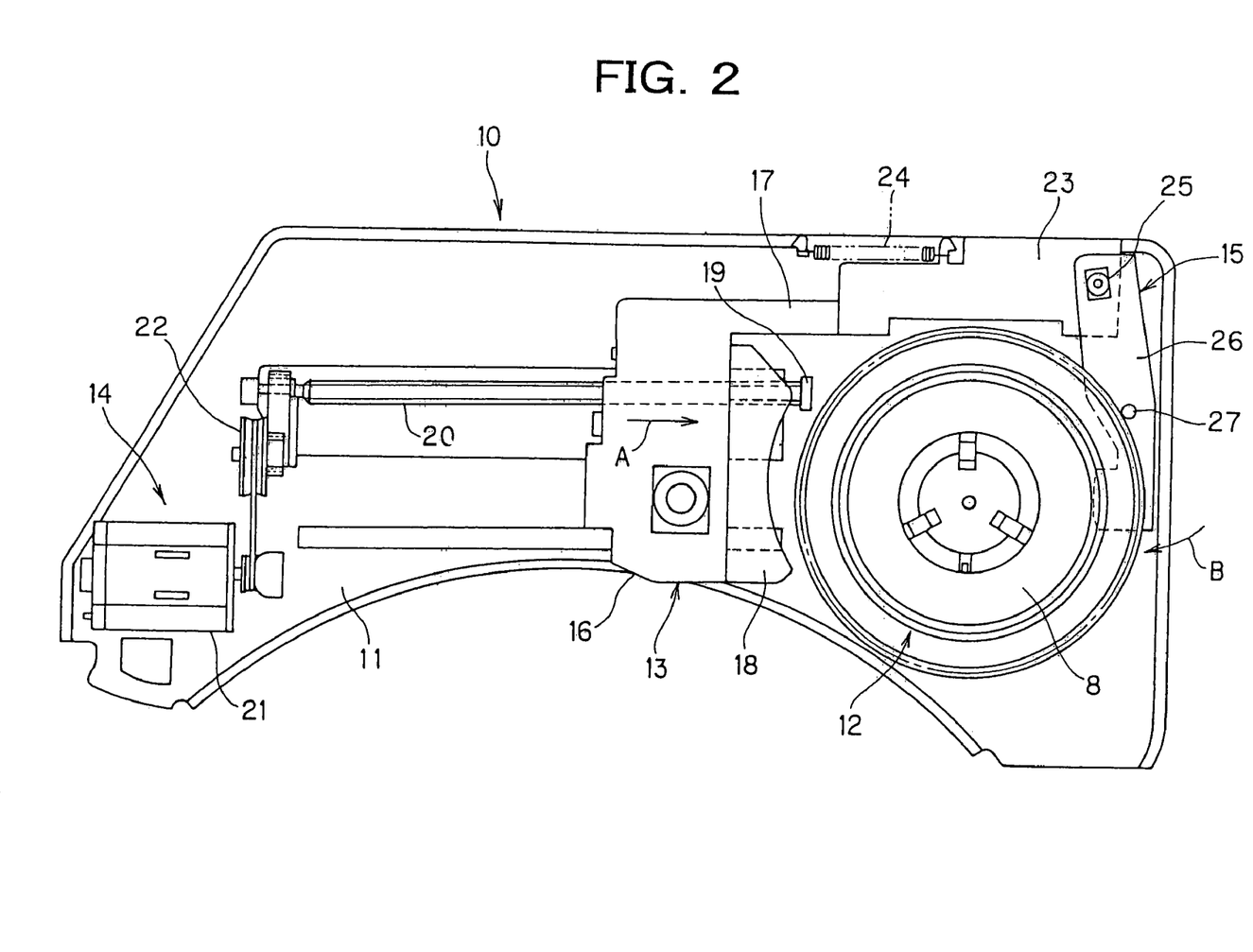
FIG. 2 is a plan view showing a disk-reproducing mechanism according to an embodiment of the present invention.

FIG. 2 shows a plan view of the disk reproducing mechanism configured in accordance with the present embodiment. As shown in FIG. 2, a disk reproducing unit 10 has a movable base 11, on which a turntable 12, pickup 13, pickup moving mechanism 14, and a clamp/alignment controlling mechanism 15 are mounted, respectively. When being used, the disk reproducing unit 10 is incorporated in a disk apparatus.

The pickup 13 is provided with a securing base 16 formed into an approximately L-shape in its plane view. A pressing protrusion 17 is integrally formed on one side of the securing base 16, the one side facing the turntable 12. Additionally, on the one side of the securing base 16, an operating member 18 is secured.

The pickup moving mechanism 14 is provided with a screw shaft 20 whose one end is supported by a support member 19. Further, the pickup moving mechanism 14 is provided with a drive motor 21 and a drive-force transmission mechanism 22 including pulleys and belts to transmit a drive force generated by the drive motor 21 to the screw shaft 20.

The clamp/alignment controlling mechanism 15 includes a movement member 23, a coil spring 24, and an operation lever 26. Of these constituents, the movement member 23 is pressed by the pressing protrusion 17 formed on the securing base 16 of the pickup 13. The coil spring 24 forces the movement member 23 downward in the drawing of FIG. 2. The operation lever 26 is rotatably connected with the movement member 23 via a connection shaft 25, so that the operation lever 26 is configured rotatably around a support shaft 27.

Figure 3:
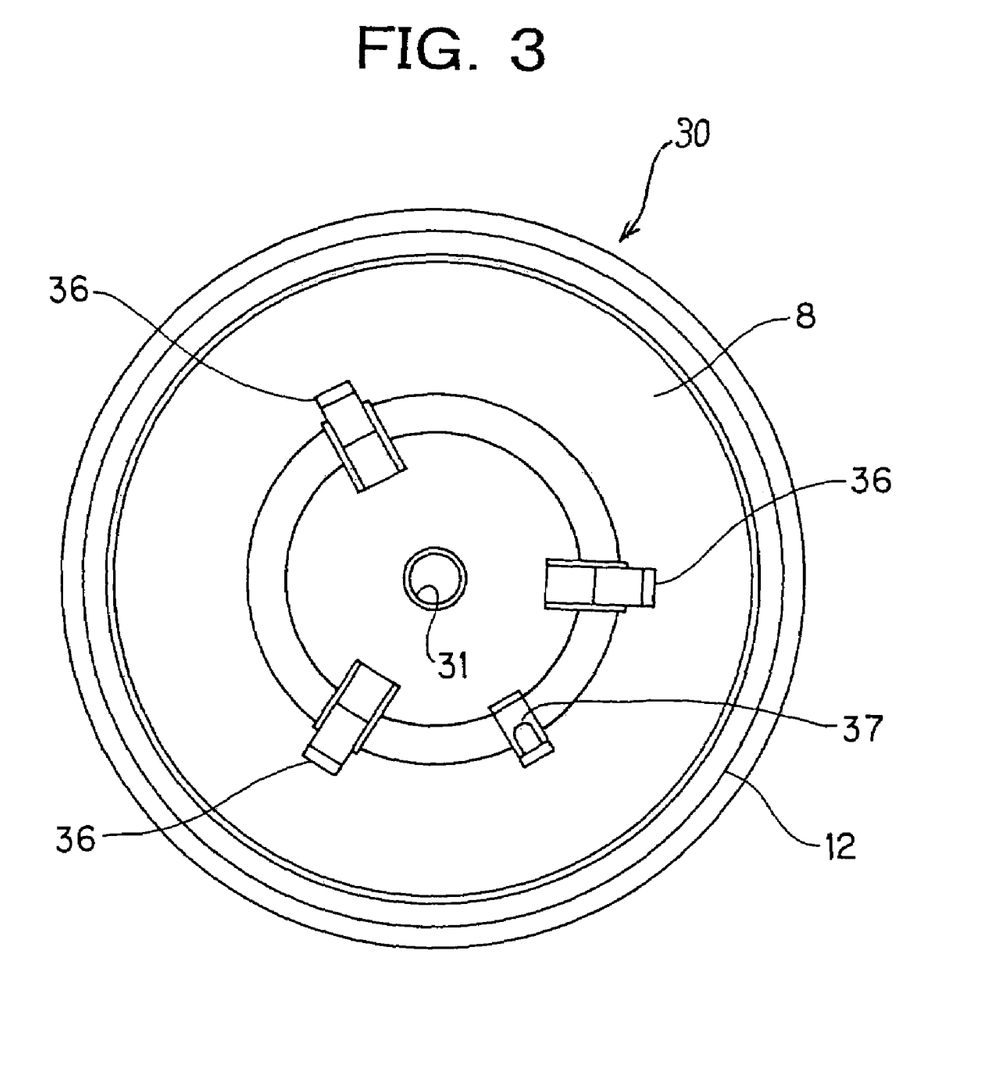
FIG. 3 is a plan view of a turntable shown in FIG. 2.
Figure 4:
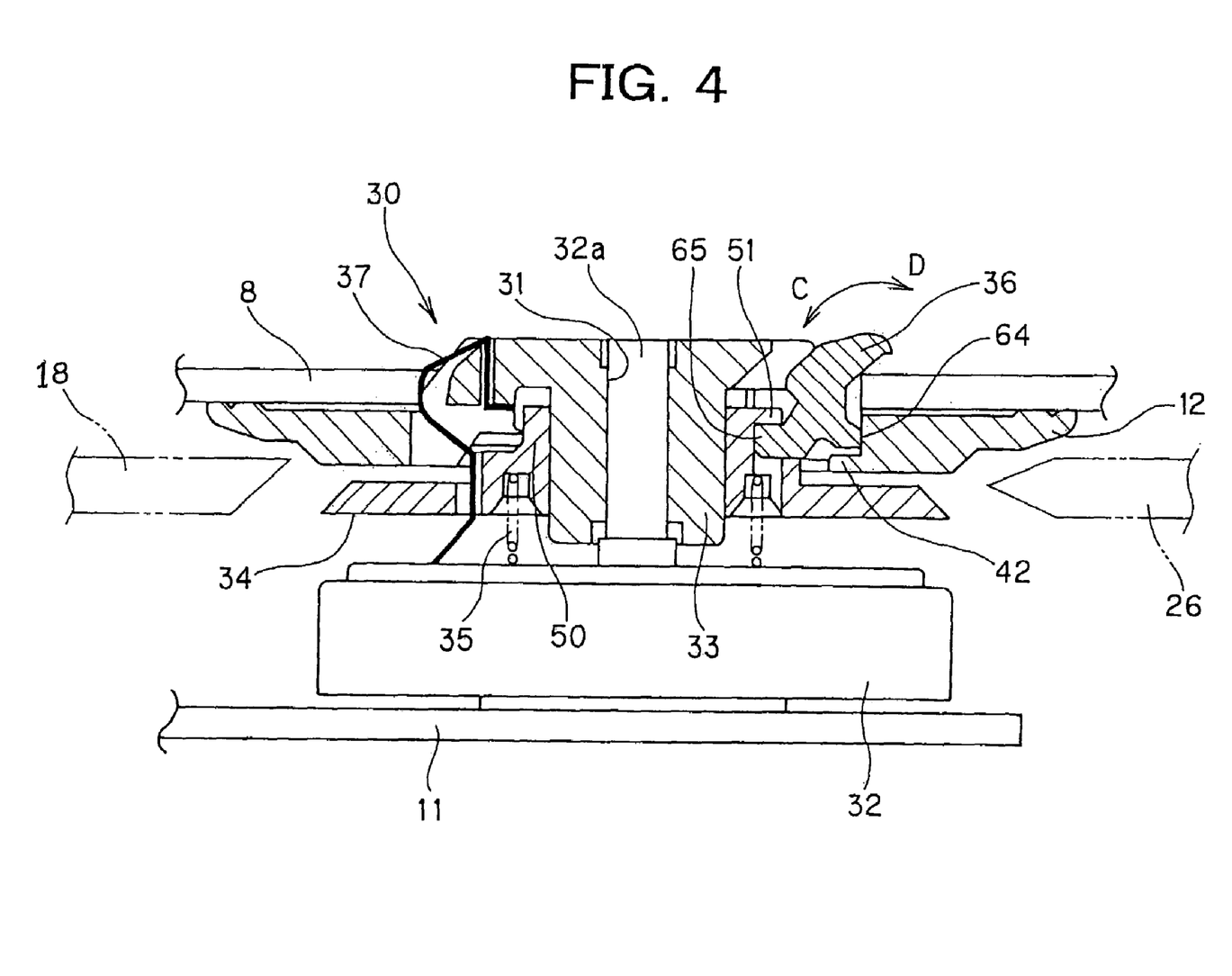
FIG. 4 is a longitudinal sectioned view representing a clamped state of a disk realized by the clamp/alignment mechanism employed by the disk-reproducing mechanism shown in FIG. 2.
Figure 5:
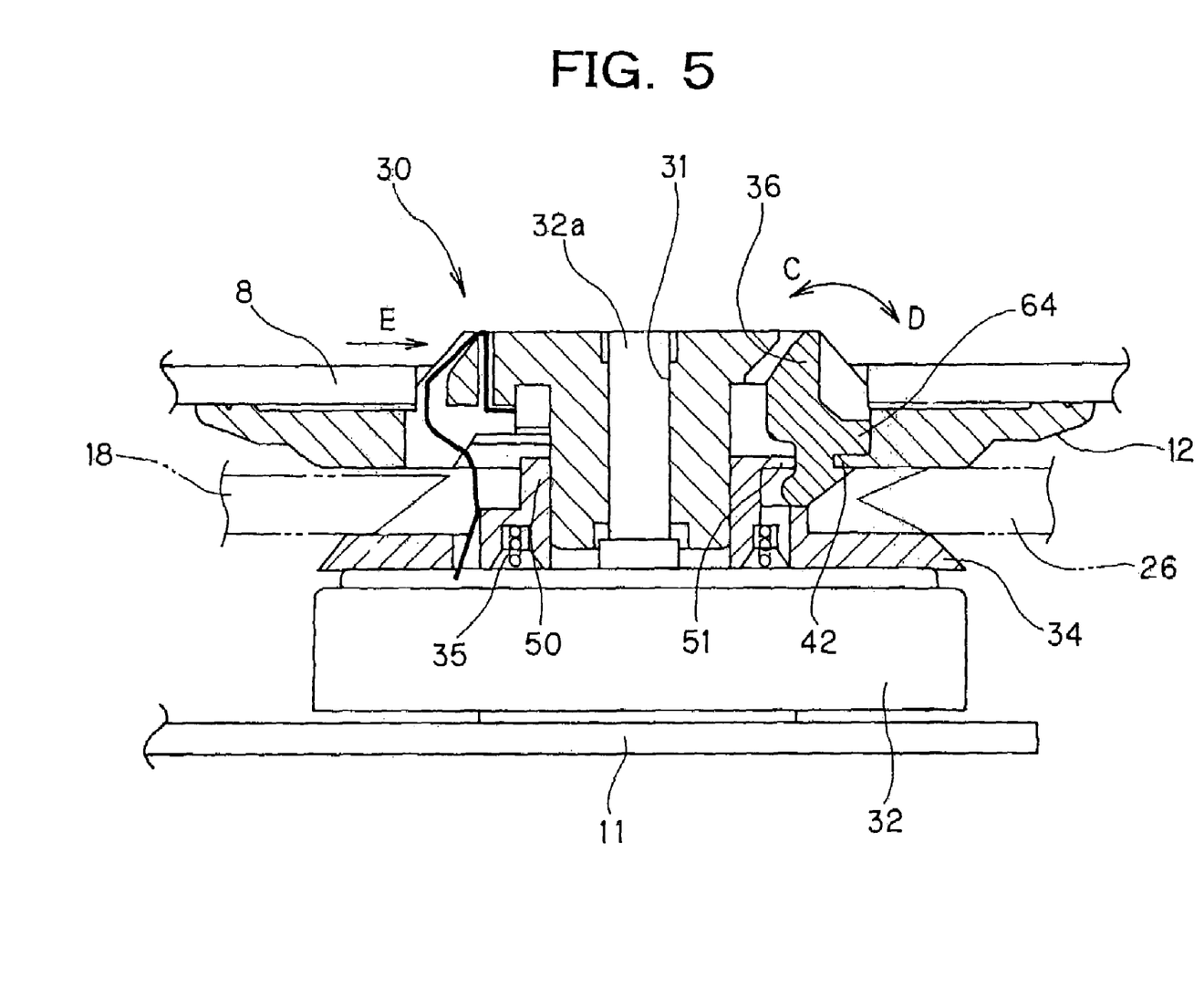
FIG. 5 is a longitudinal sectioned view representing an unclamped state of a disk realized by the clamp/alignment mechanism employed by the disk-reproducing mechanism shown in FIG. 2.
Figure 6:
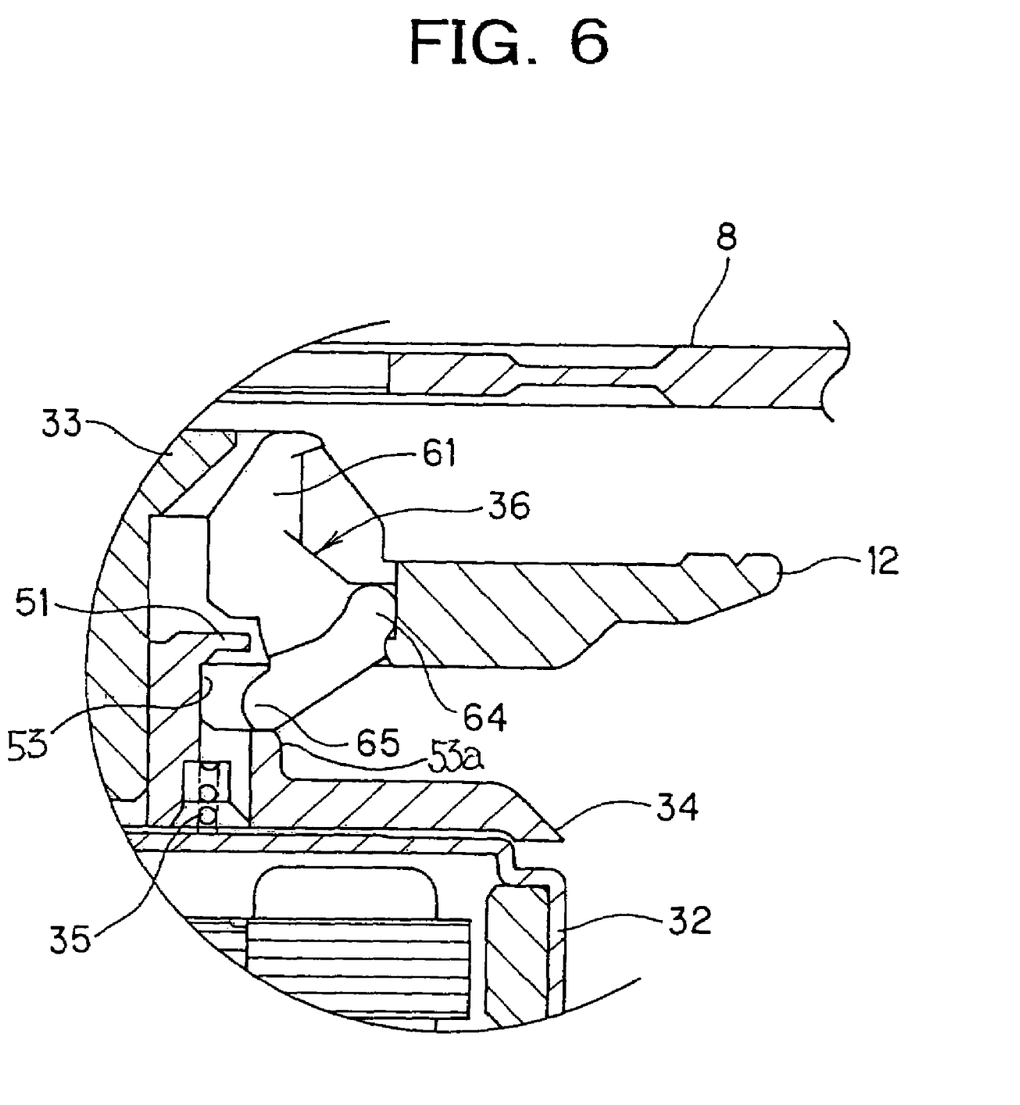
FIG. 6 is an enlarged sectional view of the clamp mechanism shown in FIG. 5.
Figure 7:
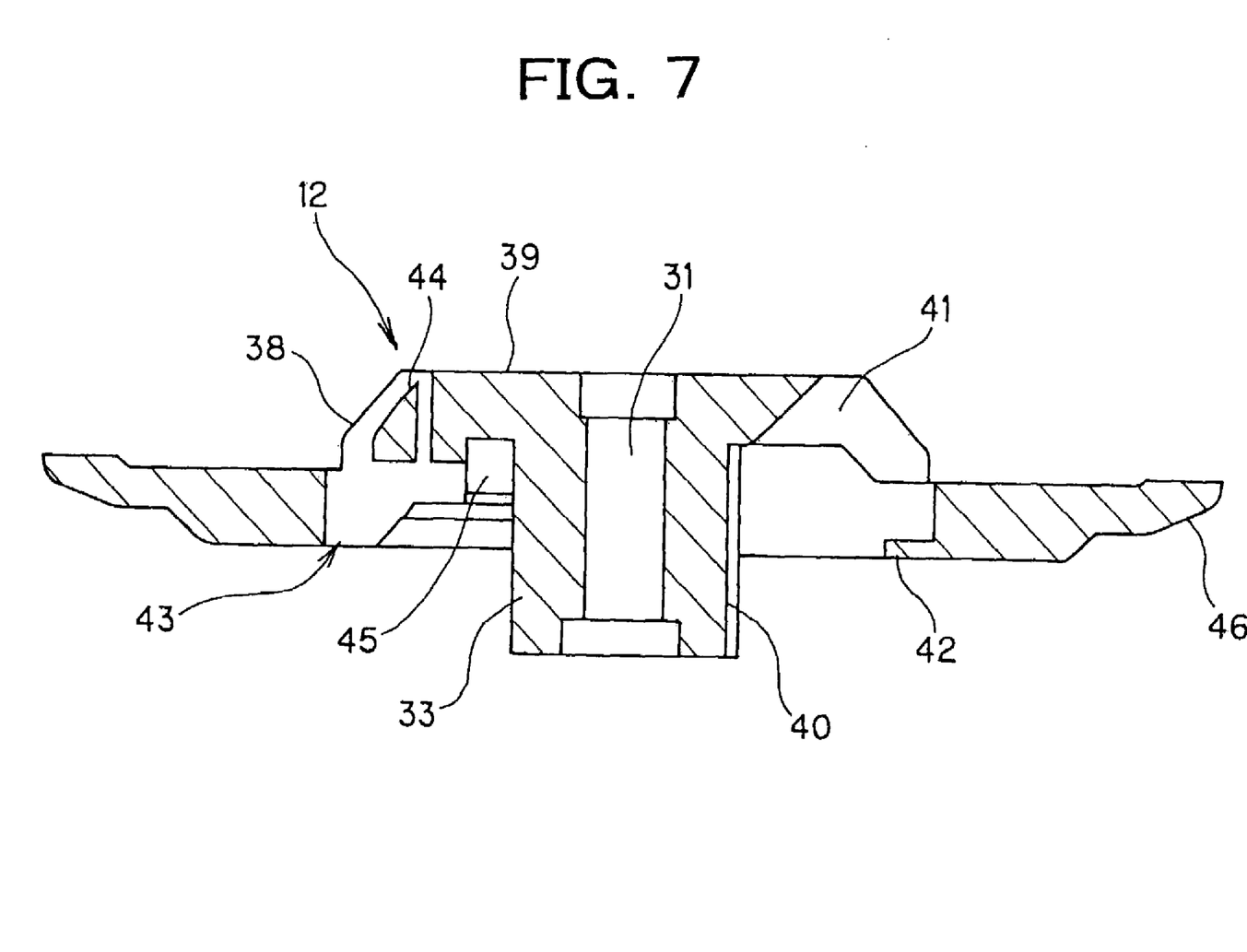
FIG. 7 is a longitudinal sectional view of the turntable shown in FIG. 3.
Figure 8:
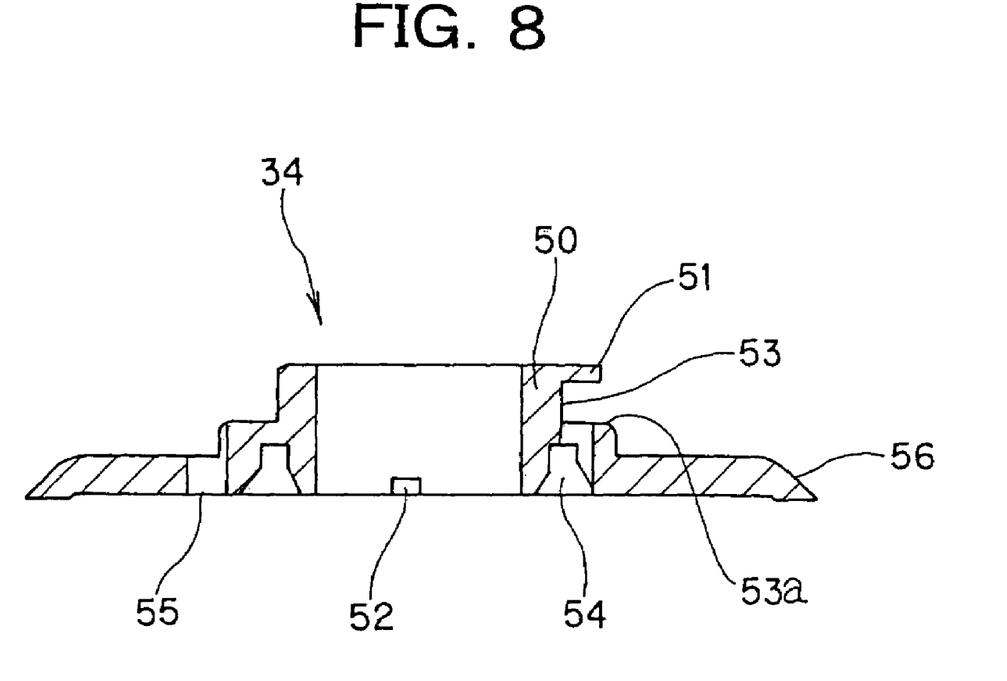
FIG. 8 is a longitudinal sectional view showing one movable member of the clamp/alignment mechanism.
Figure 9A:
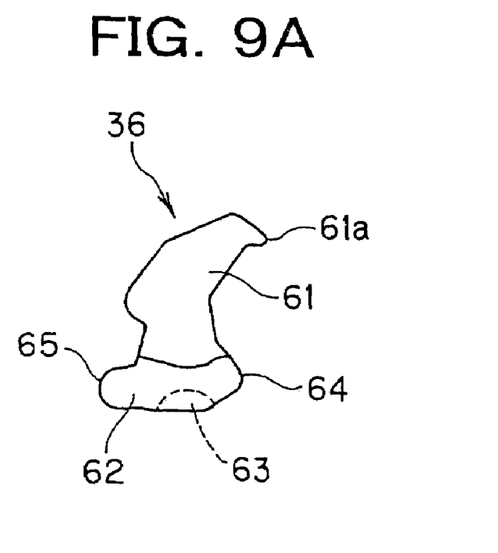
FIGS. 9A and 9B show a side view and the frontal view of a chuck claw used by the clamp/alignment mechanism, respectively.
Figure 9B:
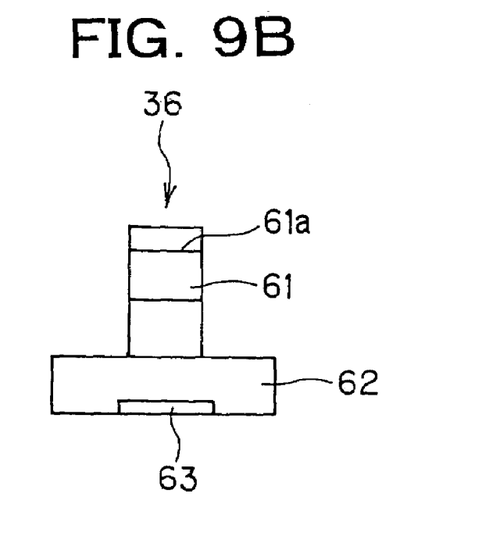
Figure 10A:
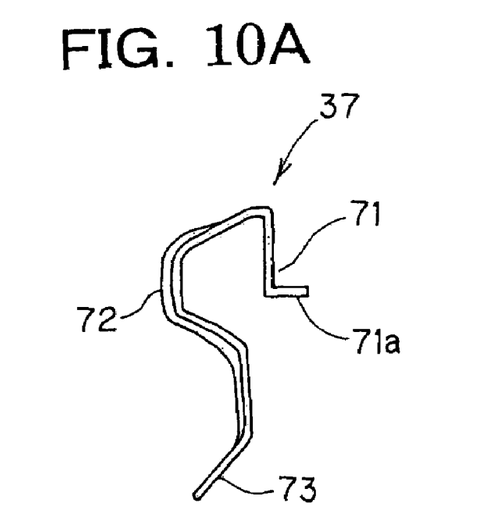
FIGS. 10A and 10B show a side view and the frontal view of an alignment member used by the clamp/alignment mechanism, respectively.
Figure 10B:
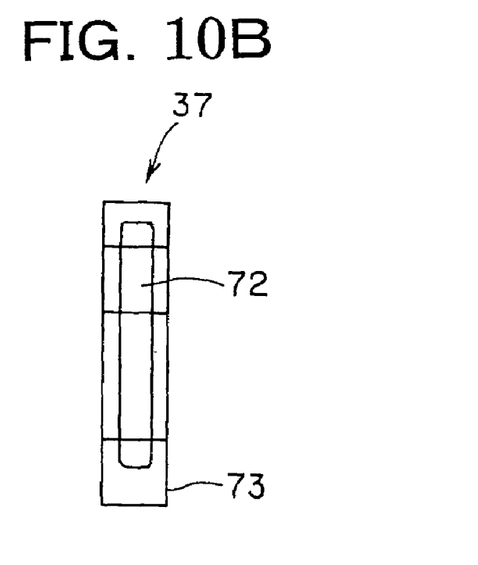

FIG. 3 is a plane view of the turntable shown in FIG. 2; FIGS. 4 and 5 are, respectively, longitudinal sectioned views each representing a clamped or unclamped state of a disk realized by the clamp/alignment mechanism employed by the disk-reproducing mechanism shown in FIG. 2; and FIG. 6 is an enlarged section view of a clamp mechanism shown in FIG. 5. Further, FIG. 7 is a longitudinal sectional view of the turntable shown in FIG. 3; FIG. 8 is a longitudinal sectional view showing one movable member of the clamp/alignment mechanism; FIGS. 9A and 9B show a side view and the frontal view of a chuck claw used by the clamp/alignment mechanism, respectively; and FIGS. 10A and 10B show a side view and the frontal view of an alignment member used by the clamp/alignment mechanism, respectively.

FIGS. 3 to 6 show a clamp/alignment mechanism 30 that essentially comprises the turntable 12, a rotation motor 32, a movable member 34, a spring 35, a plurality of chuck claws 36 functioning as a holding device, and an alignment member 37 functioning as an aligning device.

The turntable 12 is formed into a disk-like plate having a disk-mounting surface on which the disk 8 is mounted. The rotation motor 32 serves as a rotation driving device mounted and its rotation shaft 32a is inserted into a shaft-inserting perforation 31 of the turntable 12. The movable member 34 fixedly accepts a cylindrical portion 33 of the turntable 12 and is slidable in a direction perpendicular to a disk-mounting surface of the turntable 12 (that is, slidable in the up-and-down direction in FIGS. 4 and 5). Further, the spring 35 intervenes between the movable member 34 and the rotation motor 32, with the result that the movable member 34 is forced upward or downward. The plural chuck claws 36 are arranged to be able to freely emerge above and submerge below the disk-mounting surface of the turntable 12. The alignment member 37 is arranged to align the disk 8 mounted on the turntable 12.

The turntable 12 is thus able to rotate responsively to the rotation of the axis 32a of the motor 32, and both of the movable member 34 and the spring 35 rotate together in response to the turntable 12.

As shown in FIG. 7, the turntable 12 is formed so that it has the cylindrical portion 33 integrally formed with the turntable 12 to protrude from the center on the lower surface of the turntable 12. The shaft-inserting perforation 31 is formed through the cylindrical portion 33 and, as described above, the rotation shaft 32a of the motor 32 is fit into the perforation 31. On the other hand, on the upper surface of the turntable 12 is formed a circular stepped portion 39 that is linked to a sloped surface 38 onto which the center hole of the disk 8 is applied.

As shown in FIG. 7, on the outer circumferential surface of the cylindrical portion 33, three longitudinal recessed grooves 40 are formed at equal intervals in the circumferential direction. Practically, the three recessed grooves 40 are formed at angular intervals of 120 degrees when measured from the center of the turntable 12. Furthermore, in a space ranging from the stepped portion 39 of the turntable 12 to the bottom thereof, three claw-mounting spaces 41 used for containing therein the chuck claws 36 are formed at equal intervals in the circumferential direction. In other words, the three claw-mounting spaces 41 are formed at angular intervals of 120 degrees when measured from the center of the turntable 12. At the position corresponding to the bottom of each claw-mounting space 41, a supporting protrusion 42 to support each chuck claw 36 is integrally formed with the turntable so that it protrudes radial-inward from the turntable 12.

Additionally, an alignment-member loading space 43, with which the alignment member 37 is loaded (mounted), is formed to locate at a given one spot of the turntable 12 such that the space 43 passes through from the stepped portion 39 of the turntable 12 to the bottom of the turntable 12. Such one spot is located oppositely to one of the three claw-mounting spaces 41, that is, located at a given position turned by 180 degrees around the shaft-inserting perforation 31. Within the alignment-member loading space 43, an alignment-member fixed-engaging portion 44 that fixedly engages with one end of the alignment member 37 is formed integrally with the turntable 12.

A circular stepped recess 45 that can accept the movable member 34 is formed on the bottom, other than the three claw-mounting spaces 41 and the alignment-member loading space 43, of the stepped portion 39. Around the stepped portion 39, a tapered flange 46 is also formed integrally with the stepped portion 39. The lower surface of the tapered flange 46 is shaped to be ascendant outwardly in the radial direction thereof.

FIG. 8 shows in detail the movable member 34 having a cylindrical portion 50 formed at a central part of the member 34. On the upper end of the cylindrical portion 50, three pressing protrusions 51 are integrally formed with the body so that they protrude outwardly in the radial direction of the body. The pressing protrusions 51, which serve as a limiting device, are located at equal intervals in the circumferential direction, that is, at angular intervals of 120 degrees when viewed from the center of the turntable 12.

These pressing protrusions 51 limit rotational motions of the plural chuck claws 36 at certain rotational positions in the case that the chuck claws 36 are driven to rotate in a direction determined to release the chuck claws 36 that have clamped the disk 8. To be specific, the pressing protrusions 51 press the lower ends of the chuck claws 36 downward when the movable member 34 is driven to slide in the downward direction going away from the turntable 12. This press operation enables the chuck claws 36 to forcibly rotate in a direction permitting the disk 8 to be released from its clamped state on the turntable 12. The direction corresponds to a downward direction submerging below the disk-mounting surface of the turntable 12 (hereafter, referred to as an unclamping direction). Thus, the chuck claws 36 can be prevented from rotating in an upward direction emerging above the disk-mounting surface of the turntable 12 (hereafter, referred to as a clamping direction).

Due to some reasons, the chuck claws 36, which were once driven down to their predetermined lowest positions in the unclamping direction, may be driven in the clamping direction. If such a situation happens, rotational movements of the chuck claws 36 in their clamping directions are surely limited, because the lower end of each chuck claw 36 is pressed downward by each pressing protrusion 51.

The foregoing operating member 18, operation lever 26, movable member 34, spring 35, and pressing protrusions 51 are employed to substantially compose the driving device.

As shown in FIG. 8, on the inner circumferential lower end of the cylindrical portion 50, three projections 52 also functioning as guide members are formed integrally with the body so that they project inward in the radial direction of the cylindrical portion 50. The three projections 52 are located at equal angular intervals in the circumferential direction, that is, at angular intervals of 120 degrees when viewed from the center of the turntable 12. Each of these projections 52 is configured to fit into each of the recessed grooves 39 formed as guide members on the outer circumferential surface of the cylindrical portion 33 of the turntable 12, respectively. Thus, the movable member 34 is slidable longitudinally along the cylindrical portion 33.

Furthermore, as shown in FIG. 8, below the pressing protrusions 51 of the cylindrical portion 50, there are continuously formed engaging recesses 53 to engage with the lower end portions of the chuck claws 36 and contact surfaces 53a to allow such lower end portions to be contacted. In addition, a circular retaining groove 54 to retain one end of the spring 35 is formed at a given radial position on the bottom surface of the cylindrical portion 50.

The cylindrical portion 50 is also integrally coupled with a ring-like tapered flange 56 located around the body 50, as shown in FIG. 8. The tapered flange 56, which thus becomes outer-side part of the movable member 34, has an upper surface including an end surface descending outwardly in the radial direction thereof.

At a given inner position of the ring-like tapered flange 56 (the given inner position being near to the cylindrical portion 50), an alignment-member inserting hole 55 is formed through the flange 56. Thus, the alignment member 37 is inserted and one end portion thereof remains therethrough, as shown in FIG. 3. When the movable member 34 is slid to move away from the turntable 12, an inner wall of the alignment-member inserting hole 55 is forced to push one end portion of the alignment member 37 toward the cylindrical portion 50. Hence, the other end of the alignment member 37, which is fixed, is able to work as a fulcrum, so that the elasticity owned by the alignment member 37 can be utilized. Namely, the one end portion of the alignment member 37 can be shifted elastically toward the cylindrical portion 50 responsibly to a downward movement of the movable member 34.

On the other hand, as shown in FIGS. 4 and 5, each chuck claw 36 is loaded rotatably in each of the three claw-mounting spaces 41 formed in the turntable 12. Each chuck claw 36 is permitted to emerge or submerge above or below the disk-mounting surface of the turntable 12 by making the movable member 34 slide along the cylindrical portion 33 of the turntable 12. These emerging and submerging operations, that is, clamping and unclamping operations, make it possible to detachably mount the disk 8 on the turntable 12. During each of such operations, the lower end portion of each chuck claw 36 is held by each supporting protrusion 42 of the turntable 12 and each engaging recess 53 of the movable member 34.

Each chuck claw 36, which is made of, for example, synthetic resin, is shaped into an integral form. As shown in FIGS. 9A and 9B, each chuck claw 36 has a hook-shaped body 61 on its one end side, in which the body 61 further has at its end a holding tip 61a formed into a sectional shape approximately similar to a wedge shape. Every time the movable member 34 moves upward to remain at a predetermined high position, the hook-shaped body 61 is forced to appear from, that is, emerge above the disk-mounting surface of the turntable 12. This protrusion of the hook-shaped body 61 enables its holding tip 61a to hold the disk 8 on the turntable 12.

The other end side of each chuck claw 36 is formed as a base 62 shaped into a substantially rectangular plate-like form. On the bottom surface of the base 62 is formed a bottomed recess 63 into which each supporting protrusion 42 of the turntable 12 can be fit. On the front side of the base 62, a support protrusion 64 is formed, which is held (supported) by each supporting protrusion 42. Further, on the back side of the base 62 is formed an engaging protrusion 65 that can be fit into each engaging recess 53 of the movable member 34 so as to come into contact with each contact surface 53a.

Thus, each of the plurality of chuck claws 36 is configured such that one side thereof can be rotated about the support protrusion 64 formed at one end of the base 52. On the other end opposing the one side, an engaging protrusion 65 is formed. Accordingly, the engaging protrusion 65 is configured such that it is pressed by each pressing protrusion 51 of the movable member 34.

Still, as shown in FIGS. 4 and 5, the alignment member 37 is loaded (mounted) to the alignment-member loading space 43 of the turntable 12 in such a manner that one end of the alignment member 37 is fixedly engaged with the alignment-member fixed-engaging portion 44 of the turntable 12. That is, the alignment member 37 is deformable due to its elasticity, like a cantilever beam of which one end is fixedly held but of which other end thereof is movable.

To be specific, the alignment member 37 is composed of an elastic member, which is made of a metal blade spring, for instance. As shown in FIG. 10A, the alignment member 37, which is formed into an approximate sigmoid shape (when viewed from a side thereof), has an alignment claw portion 71 at the one end. This alignment claw portion 71 is fixedly engaged with the alignment-member fixed-engaging portion 44 of the turntable 12. The alignment claw portion 71 includes a hook nail portion 71a formed at the tip. The hook nail portion 71a makes it possible that the alignment claw portion 71 is fixedly held in a secure manner.

Furthermore, as shown in FIGS. 10A and 10B, the alignment member 37 includes an aligning protruded portion 72 formed to compose part of the alignment member 37. The aligning protruded portion 72 is located, if loaded to the turntable 12, to be opposed to the circumferential edge of the central hole of a disk 8 mounted on the turntable 12. In cases where the movable member 34 is located at an upper given position, the aligning protruded portion 72 is made to forcibly touch the circumferential edge of the central hole of a disk 8 mounted on the turntable 12, thereby biasing the disk 8 in the radial direction. Accordingly, the disk 8 can be aligned. On the other hand, when the movable member 34 is located at a lower given position, the aligning protruded portion 72 is made to draw back to a given retreat position that disables the aligning protruded portion 72 for the alignment, because the aligning protruded portion 72 locating at the retreat position does not touch the circumferential edge of the central hole of a disk 8 mounted on the turntable 12.

In addition, as shown in FIG. 10A, the other end portion of the alignment member 37 is formed into an alignment-pressure receiving portion 73, which is inserted into the alignment-member inserting hole 55. Hence when the movable member 34 is forced to slide in a direction getting away from the turntable 12, the wall of the alignment-member inserting hole 55 pushes the alignment member 37 in a direction which advances toward the cylindrical portion 50 of the movable member 34. That is, the alignment member 37 is pushed in a direction that causes the aligning protruded portion 72 to retreat to a location where the alignment by the aligning protruded portion 72 is disabled (i.e., the aligned state is released). In other words, the alignment member 37 is configured such that, in response to such a pushing action, the alignment member 37 is elastically bent toward the cylindrical portion 50 of the movable member 34, like a cantilever beam, with the alignment claw portion 71 functioning as a fulcrum.

The operations and advantages of the clamp/alignment mechanism 30 according to the present embodiment will now be described.

When the disk reproducing unit 10 is in operation with the disk 8 clamped on the turntable 12, the clamp mechanism 30 is brought into a state shown in FIG. 4. In the state shown therein, the plural chuck claws 36 protrude above the disk-mounting surface of the turntable 12 so that the disk 8 is securely held on the turntable 12, while the alignment member 37 is in alignment of the disk 8 in a secure manner.

In cases where an operator issues a command to eject the disk 8 (for instance, by pressing an eject button placed on a disk apparatus), the disk reproducing unit 10 begins releasing both the clamped state and the aligned state of the disk 8 responsively to the issued command. First, the motor 21 is driven to rotate, where a generated drive force is transmitted to the screw shaft 20 via the drive-force transmission mechanism 22, resulting in that the screw shaft 20 is forcibly rotated. The rotation of the screw shaft 20 allows the pickup 13 to move in a direction "A" shown in FIG. 2, so that both of the pressing protrusion 17 and the operating member 18 travel in the same direction "A" responsibly to the move of the pickup 13.

The travel of the operating member 18 will cause the movement member 23 to move in the direction toward the turntable 12 against a repelling force of the coil spring 24. In response to the travel of the operating member 18, the operation lever 26 connected to the connection shaft 25 is forced to rotate around the support shift 27 in a direction "B" shown in FIG. 2. Thus, as shown in FIG. 5, both of the operation lever 26 and the operating member 18 are forcibly inserted into a space formed between the turntable 12 and the movable member 34. Their insertions push down the movable member 34.

During a downward movement of the movable member 34 carried out in response to the insertions of both of the operation lever 26 and the operating member 18, the engaging protrusion 65 of each chuck claw 36 is pushed down by each pressing protrusion 51 of the movable member 34. Hence, each chuck claw 36 is forcibly rotated in a direction "C" around the support protrusion 64 (i.e., a fulcrum) of the base 62 supported by each supporting protrusion 42 of the turntable 12. This rotation responsibly causes each hook-shaped body 61 to retreat below the disk-mounting surface of the turntable 12, so that the hook-shaped body 61 is submerged into each claw mounting space 41. The chuck claws 36 are therefore obliged to move to a given retreat position where the clamping operation is disabled, whereby the clamped state of the disk 8 can be released.

In parallel with the above unclamping operation, the alignment-pressure receiving portion 73 of the alignment member 37 is pushed inward by the alignment-member inserting hole 55 of the movable member 34 toward the cylindrical potion 50 thereof. This pushing operation allows the alignment member 37 to be bent in a direction shown by an arrow "E" in FIG. 5, with the alignment claw portion 71 (functioning as the fulcrum) fixedly engaged with the alignment-member fixed-engaging portion 44 of the turntable 12, thus the aligning protruded portion 72 retreating to a location that makes the alignment disabled. Accordingly the aligned state of the disk 8 is released.

Then the disk reproducing unit 10 is subject to a slide operation in the disk apparatus so that the unit 10 is taken out of the apparatus.

It is thus possible for the user to easily exchange the disk 8 mounted on the turntable 12 to a new one. That is, whenever the user mounts newly the disk 8 onto the turntable 12, the clamp and alignment operations are released. Therefore, during the operation for mounting the disk 8 onto the turntable 12, it is unnecessary to forcibly push an aligning blade spring down to gain the mounting space, unlike the conventional.

After the user has mounted a new disk 8 onto the turntable 12, the disk apparatus can respond to such a user's command as insertion command of the disk 8 (for instance, the command is issued when the user presses an insertion button arranged on the disk apparatus). The disk reproducing unit 10 is thus delivered into the disk apparatus.

Then the rotation of the drive motor 21 causes the screw shaft 20 to rotate, with the result that both of the pressing protrusion 17 and the operating member 18 travel in the opposite direction to the direction "A" in FIG. 2. The travel of the operating member 18 will cause the movement member 23 to move in the direction away from the turntable 12 thanks to a biasing force from the coil spring 24. Responsively, the operation lever 26 connected to the connection shaft 25 is forced to rotate around the support shift 27 in the direction opposite to the direction "B" shown in FIG. 2. Thus, as shown in FIG. 4, both of the operation lever 26 and the operating member 18 are drawn out of the space formed between the turntable 12 and the movable member 34, resulting in that the movable member 34 is pushed up by a biasing force from the spring 35.

As the movable member 34 is pushed up, the engaging protrusion 65 of each chuck claw 36 is gradually pushed up by each contact surface 53a of the movable member 34. Thus each chuck claw 36 is forced to rotate in the direction "D" (refer to FIGS. 4 and 5) around the support protrusion 64 serving as the fulcrum, resulting in that the hook-shaped body 61 is forcibly made to emerge above the disk-mounting surface of the turntable 12. Accordingly, the disk 8 can be clamped by the holding tips 61a of the chuck claws 36.

In parallel with the above clamping operation, the pushing operation of the alignment-member inserting hole 55 of the movable member 34 toward the alignment-pressure receiving portion 73 of the alignment member 37 is released gradually. Thus, this release operation allows the bent alignment member 37 to be restored toward the direction opposite to the arrow "E" (in FIG. 5), with the alignment claw portion 71 functioning as the fulcrum. The aligning protruded portion 72 is forced to come into contact with the circumferential edge of the central hole of the disk 8 so as to push the aligning protruded portion 72, whereby the disk 8 can be aligned.

As described above, the clamp/alignment mechanism according to the present embodiment adopts the above configuration utilizing the movable member 34 and the others. In this configuration, in cases where each chuck claw 36 is driven in the direction to allow the disk 8 to be clamped, simultaneously, the alignment member 37 is driven in the direction to enables the disk 8 to be aligned, while in cases where each chuck claw 36 is driven in the direction to allow the disk 8 to be released from its clamped state, the alignment member 37 is driven in the direction to enables the disk 8 to be released from its aligned state. As a result, the disk 8 can be clamped and aligned with stableness.

Further, during the mounting operation of the disk 8 onto the turntable 12, the chuck claws 36 are driven to their retreat positions that disable the chuck claws 36 for clamping the disk 8, whilst the alignment member 37 is driven to its retreat position that disables the alignment member 37 for aligning the disk 8. Hence, in mounting the disk 8 onto the turntable 12, the influence (i.e., load) of the alignment member 37 can be eliminated. Thus it is still sufficient to adopt a lowered clamping force.

Still further, the clamp/alignment mechanism has the three pressing protrusions 51 are mounted at equal intervals on the upper circumferential end of the cylindrical portion 50 of the movable member 34. When the movable member 34 is forced to slide downward away from the turntable 12 (that is, pushed down), the pressing protrusions 51 push the lower ends of the plural chuck claws 36 in their unclamping directions. This pushing action prevents each chuck claw 36 from rotating in the clamping direction. Therefore, even when the disk 8 (i.e., its information-recording surface) is placed at any angular attitude, the clamped state of the disk 8 can be released forcibly in a steady manner. This forcible release of the clamped state provides greatly improved steadiness to unclamping operations, without failure in releasing the clamped state.

By the way, the present invention can be reduced into practice in a variety of other modifications. In the foregoing embodiment, the pressing protrusions 51 (i.e., the limiting device) have been formed integrally with the movable member 34 and a slide of the movable member 34 causes the pressing protrusions 51 to press the lower ends of the chuck claws 36, thus limiting the chuck claws 36 from rotating in their clamping directions. However, the present invention is not limited to such configuration. By way of example, the movable member 34 can be formed as a different element from the pressing protrusions 51. Alternatively, the table-sided tip end of the movable member 34 may be linked with the lower ends of the plural chuck claws 36. In such a configuration, the linking portion serves as the limiting device, and sliding the movable member 34 brings about rotation of the plural chuck claws 36 until the rotation is engaged with the linking portion.

Still, though the foregoing embodiment has been described about the example where the clamp/alignment mechanism is applied to the disk reproducing mechanism (i.e., information-reproducing mechanism) for reproducing bits of information from recording mediums, such as CDs and DVDs, this is not a definitive list. Alternatively, the clamp/alignment mechanism may be applied to the disk recording mechanism (i.e., information-recording mechanism) for recording bits of information onto recording mediums, such as CDs and DVDs, thus providing the similar or identical advantages to the foregoing embodiment.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2002-231753 filed on Aug. 8, 2002 including the specification, claims, drawings and summary is incorporated herein by reference in its entirety.

What is claimed is:

1. A clamp/alignment mechanism comprising:
a turntable on which a recording medium is mounted, the turntable being rotated by a rotation driving device;
a holding device for holding the recording medium mounted on the turntable;
an aligning device for aligning the recording medium mounted on the turntable; and
a driving device for driving both the holding device and the alignment device;
wherein the driving device is configured to drive the aligning device in an aligning direction along which the recording medium is subjected to alignment thereof when the holding device is driven by the driving device in a holding direction in which the recording medium is to be held; and
wherein the aligning device is made up of an elastic member having two ends, one end of which being fixedly engaged with the turntable, and the driving device is configured to push the other end of the elastic member in an alignment-releasing direction along which the recording medium is subjected to release from an aligned state.

2. The clamp/alignment mechanism according to claim 1, wherein the holding device is configured to locate at a retreat position which disables the holding device from holding the recording medium and the aligning device is configured to locate at a retreat position which disables the aligning device from aligning the recording medium when the recording medium is mounted onto the turntable.

3. The clamp/alignment mechanism according to claim 1, wherein the driving device has a movable member slidable in a direction perpendicular to a plane of the turntable on which the recording medium is mounted, the movable member being placed to push the other end of the elastic member in the alignment-releasing direction of the recording medium when the movable member is made to slide in a direction away from the plane of the turntable.

4. The clamp/alignment mechanism according to claim 3, wherein the holding device is made up of a plurality of chuck claws mounted rotatably on the turntable, wherein the movable member is placed to push the plurality of chuck claws in the hold-releasing direction of the recording medium when the movable member is made to slide in the direction away from the plane of the turntable.

5. The clamp/alignment mechanism according to claim 1, wherein the driving device includes a limiting device for limiting the holding device from being moved in the holding direction of the recording medium when the holding device is driven in a hold-releasing direction in which the recording medium is to be released from a held state.

6. The clamp/alignment mechanism according to claim 5, wherein the holding device is made up of a plurality of chuck claws mounted rotatably on the turntable,
the driving device has a movable member slidable in a direction perpendicular to a plane of the turntable on which the recording medium is mounted, and
the limiting device is configured to push the plurality of chuck claws in the hold-releasing direction of the recording medium when the movable member is made to slide in a direction away from the plane of the turntable.

7. A clamp/alignment mechanism comprising:
a turntable on which a recording medium is mounted, the turntable being rotated by a rotation driving device;
a holding device for holding the recording medium mounted on the turntable;
an aligning device for aligning the recording medium mounted on the turntable; and
a driving device for driving both the holding device and the alignment device;
wherein the driving device is configured to drive the aligning device in an alignment-releasing direction along which the recording medium is subjected to release from an aligned state thereof, when the holding device is driven by the driving device in a hold-releasing direction in which the recording medium is to be released from a held state thereof; and
wherein the aligning device is made up of an elastic member having two ends, one end of which being fixedly engaged with the turntable, and the driving device is configured to push the other end of the elastic member in the alignment-releasing direction of the recording medium.

8. The clamp/alignment mechanism according to claim 7, wherein the holding device is configured to locate at a retreat position which disables the holding device from holding the recording medium and the aligning device is configured to locate at a retreat position which disables the aligning device from aligning the recording medium when the recording medium is mounted onto the turntable.

9. The clamp/alignment mechanism according to claim 7 wherein the driving device has a movable member slidable in a direction perpendicular to a plane of the turntable on which the recording medium is mounted, the movable member being placed to push the other end of the elastic member in the alignment-releasing direction of the recording medium wherein the movable member is made to slide in a direction away from the plane of the turntable.

10. The clamp/alignment mechanism according to claim 9, wherein the holding device is made up of a plurality of chuck claws mounted rotatably on the turntable, wherein the movable member is placed to push the plurality of chuck claws in the hold-releasing direction of the recording medium when the movable member is made to slide in the direction away from the plane of the turntable.

11. The clamp/alignment mechanism according to claim 7, wherein the driving device includes a limiting device for limiting the holding device from being moved in the holding direction of the recording medium when the holding device is driven in the alignment-releasing direction of the recording medium.

12. The clamp/alignment mechanism according to claim 11, wherein the holding device is made up of a plurality of chuck claws mounted rotatably on the turntable, the driving device has a movable member slidable in a direction perpendicular to a plane of the turntable on which the recording medium is mounted, and the limiting device is configured to push the plurality of chuck claws in the hold-releasing direction of the recording medium when the movable member is made to slide in a direction away from the plane of the turntable.

13. An information reproducing and recording mechanism comprising a clamp/alignment mechanism comprising:
 a turntable on which a recording medium is mounted, the turntable being rotated by a rotation driving device;
 a holding device for holding the recording medium mounted on the turntable;
 an aligning device for aligning the recording medium mounted on the turntable; and
 a driving device for driving both the holding device and the alignment device,
 wherein the driving device is configured to drive the aligning device in an aligning direction along which the recording medium is subjected to alignment thereof, when the holding device is driven by the driving device in a holding direction in which the recording medium is to be held; and
 wherein the aligning device is made up of an elastic member having two ends, one end of which being fixedly engaged with the turntable, and the driving device is configured to push the other end of the elastic member in an alignment-releasing direction along which the recording medium is subjected to release from an aligned state.

14. An information reproducing and recording mechanism comprising a clamp/alignment mechanism comprising:
 a turntable on which a recording medium is mounted, the turntable being rotated by a rotation driving device;
 a holding device for holding the recording medium mounted on the turntable;
 an aligning device for aligning the recording medium mounted on the turntable; and
 a driving device for driving both the holding device and the alignment device;
 wherein the driving device is configured to drive the aligning device in an alignment-releasing direction along which the recording medium is subjected to release from an aligned state thereof when the holding device is driven by the driving device in a hold-releasing direction in which the recording medium is to be released from a held state thereof; and
 wherein the aligning device is made up of an elastic member having two ends, one end of which being fixedly engaged with the turntable, and the driving device is configured to push the other end of the elastic member in the alignment-releasing direction of the recording medium.

* * * * *